(12) United States Patent
Haruna

(10) Patent No.: US 10,166,685 B2
(45) Date of Patent: Jan. 1, 2019

(54) OUTPUT DEVICE AND OUTPUT SYSTEM

(71) Applicant: KOSMEK LTD., Hyogo (JP)

(72) Inventor: Yosuke Haruna, Hyogo (JP)

(73) Assignee: KOSMEK LTD., Hyogo (JP)

( * ) Notice: Subject to any disclaimer, the term of this patent is extended or adjusted under 35 U.S.C. 154(b) by 0 days.

(21) Appl. No.: 15/544,137

(22) PCT Filed: Feb. 24, 2016

(86) PCT No.: PCT/JP2016/055475
§ 371 (c)(1),
(2) Date: Jul. 17, 2017

(87) PCT Pub. No.: WO2016/136821
PCT Pub. Date: Sep. 1, 2016

(65) Prior Publication Data
US 2017/0348860 A1 Dec. 7, 2017

(30) Foreign Application Priority Data

Feb. 27, 2015 (JP) .................................. 2015-038069

(51) Int. Cl.
*B25J 18/00* (2006.01)
*B25J 15/04* (2006.01)
*B25J 18/04* (2006.01)

(52) U.S. Cl.
CPC ......... *B25J 18/007* (2013.01); *B25J 15/0416* (2013.01); *B25J 15/0425* (2013.01); *B25J 15/0491* (2013.01); *B25J 18/04* (2013.01)

(58) Field of Classification Search
CPC .. B25J 18/007; B25J 15/0416; B25J 15/0425; B25J 18/04; F16J 1/005; F16J 10/02; F02F 1/00
See application file for complete search history.

(56) References Cited

U.S. PATENT DOCUMENTS 5,649,956 A * 7/1997 Jensen .................... B25J 9/1065
403/316
5,807,378 A * 9/1998 Jensen ........................ B25J 3/04
403/316

(Continued)

FOREIGN PATENT DOCUMENTS

EP    2 816 238 A1    12/2014
JP    H05 169383 A    7/1993

(Continued)

OTHER PUBLICATIONS

International Search Report dated Mar. 24, 2016 for PCT/JP2016/055475.

(Continued)

*Primary Examiner* — Zakaria Elahmadi
(74) *Attorney, Agent, or Firm* — Bacon & Thomas, PLLC

(57) ABSTRACT

A force multiplier (5) configured to assist movement of the operating rod (22) in its axial direction is provided. An engagement recess (52) provided on an outer periphery of the operating rod (22) has a cam surface (52a) configured to make engagement with an engagement ball (51). There is provided a support hole (53) configured to allow movement of the engagement ball (51) in a radial direction of operating rod (22) and to restrict movement of the engagement ball (51) in the axial direction of the operating rod (22). A pressing member (54) configured to press the engagement ball (51) is provided, and the pressing member (54) has a force-multiplying surface (54a).

5 Claims, 6 Drawing Sheets

(56) References Cited

U.S. PATENT DOCUMENTS

| | | | |
|---|---|---|---|
| 2009/0139375 A1* | 6/2009 | Hathaway | B23B 31/1071 81/54 |
| 2009/0160106 A1* | 6/2009 | Graves | B22D 17/2023 266/46 |
| 2013/0008003 A1* | 1/2013 | Izutani | B23K 9/26 29/402.08 |
| 2013/0199366 A1* | 8/2013 | Yokota | B25B 5/064 92/169.1 |
| 2014/0208883 A1* | 7/2014 | Lin | B25J 9/0051 74/490.05 |
| 2015/0000516 A1* | 1/2015 | Haruna | F16J 1/005 92/172 |
| 2016/0236357 A1* | 8/2016 | Kalb | B25J 17/02 |
| 2017/0232620 A1* | 8/2017 | Kalb | B25J 17/02 279/2.09 |

FOREIGN PATENT DOCUMENTS

| | | | |
|---|---|---|---|
| JP | 2000108092 A | 4/2000 | |
| JP | 2010105111 A | 5/2010 | |
| JP | 2011255482 A | 12/2011 | |
| JP | 2012213868 A | 11/2012 | |

OTHER PUBLICATIONS

International Search Report dated Mar. 24, 2016 for PCT/JP2016/055475 with English translation.
Search Report dated Sep. 17, 2018, issued in corresponding European application No. EP 16 755 565.5.

* cited by examiner

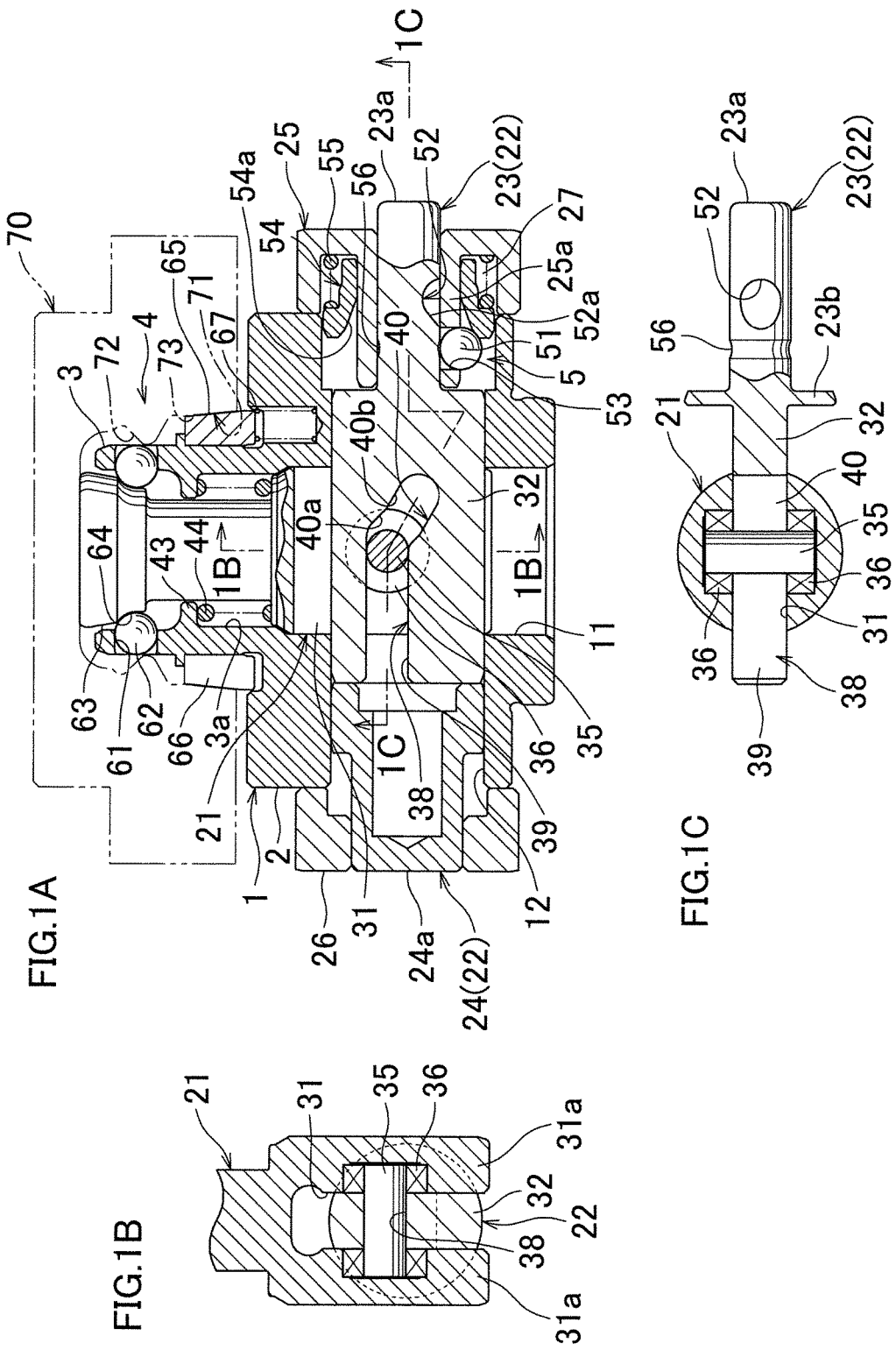

OUTPUT DEVICE AND OUTPUT SYSTEM

TECHNICAL FIELD

The present invention relates to an output device suitable for use in a state of being attached to a distal end of a robotic arm.

BACKGROUND ART

To enable a single robot to perform a variety of processes, an output device is attached to a distal end of a robotic arm, and an adapter to which various types of tools are attached is fastened to the output device. Examples of known devices which are common with the output device in functions as a fastening device in a broad sense include a device described in Patent Literature 1 specified below, though it is not used in a state of being attached to a distal end of a robotic arm. The known art is structured as follows.

In the fastening device described in Patent Literature 1, an operating rod (driving spindle) is disposed orthogonally to an output rod (fastening-releasing driven wedge). The fastening device is configured so that: the operating rod is moved in its axial direction by rotating a hexagonal wrench inserted into a hexagonal hole provided to an end portion of the operating rod; and as a result, the output rod is moved via two wedges (a fastening driving wedge and a releasing driving wedge).

CITATION LIST

Patent Literature

Patent Literature 1: Japanese Unexamined Patent Publication No. 2010-105111

SUMMARY OF INVENTION

Technical Problem

The above-described known art is disadvantageous in that a large force has to be applied to the operating rod using a tool such as the hexagonal wrench in order to move the operating rod in its axial direction.

An object of the present invention is to propose an output device to improve the above-described disadvantage.

Solution to Problem

In order to achieve the above object, in the present invention, an output device is structured as follows, for example, as shown in FIG. 1 to FIG. 2B.

An operating rod 22 inserted into a housing 1 so as to be movable in an axial direction of the operating rod 22 is configured to be moved in the axial direction by an external force in the axial direction applied to an end portion of the operating rod 22. A force multiplier 5 configured to assist movement of the operating rod 22 in the axial direction is provided between the housing 1 and the operating rod 22. An output rod 21 is configured to be moved by the operating rod 22 in the axial direction of the operating rod 22 or in a direction crossing the axial direction. The force multiplier 5 includes an engagement member 51. The engagement member 51 is configured to be fitted in an engagement recess 52 provided on an outer periphery of the operating rod 22. The engagement recess 52 has a cam surface 52a configured to make engagement with the engagement member 51. There is provided an engagement member supporter 53 configured to allow movement of the engagement member 51 in a radial direction of the operating rod 22 and to restrict movement of the engagement member 51 in the axial direction of the operating rod 22. A pressing member 54 configured to be biased by a spring 55 thereby to press the engagement member 51 is provided. The pressing member 54 has a force-multiplying surface 54a configured to make engagement with the engagement member 51.

In the output device of the present invention, the following functions and effects are provided.

In the output device of the present invention, the movement of the operating rod is assisted by the force multiplier. This makes it possible to move the operating rod with a small force, and accordingly, there is no need for using a driving means, such as a tool and a motor, which needs a large force to move the operating rod.

It is preferable that the output device of the present invention further includes the following arrangement.

A guide member 35 is provided at a base-side portion of the output rod 21. A cam groove 38 is provided in the operating rod 22 so as to be directly or indirectly make engagement with the guide member 35. The cam groove 38 has a driving groove portion 40 extending so that a distance from an axis of the operating rod 22 increases toward one of opposite axial ends of the operating rod 22.

In the above arrangement, the structure of the mechanism for transmitting force between the operating rod and the output rod is simple as compared to that of the known device (fastening device described in Patent Literature 1), and therefore the output device is advantageous in its low production cost and compact size.

According to a second aspect of the invention, an output system includes: the above-described output device; and a stocker 100 including a guide surface 90b, 91a for the movement of the operating rod 22 in the axial direction. The output system is structured as follows, for example, as shown in FIG. 3A to FIG. 5.

The stocker 100 includes: a placement table portion 86, 87 configured to support an object 70 placed thereon and to be clamped by the output device; and a guide groove 90, 91 functioning as a guide for the end portion of the operating rod 22. The guide groove 90, 91 includes the guide surface 90b, 91a provided on an inner surface of the guide groove 90, 91, and the guide surface 90b, 91a has a tapered shape. The stocker 100 is configured so that the movement of the operating rod 22 in the axial direction is achieved through insertion of the end portion of the operating rod 22 protruding from the housing 1 into the guide groove 90, 91 to bring the end portion into contact with the tapered guide surface 90b, 91a.

In the above arrangement, it is possible to move the operating rod of the output device in the axial direction of the rod by a simple operation.

Furthermore, in the output system of the present invention, it is preferable that: a lock operation portion 23a, which is one of opposite end portions of the operating rod 22 of the output device, is different in size from a release operation portion 24a, which is the other one of the opposite end portions of the operating rod 22; and the guide groove 90, 91 of the stocker 100 includes a lock guide groove 90 corresponding to the lock operation portion 23a and a release guide groove 91 corresponding to the release operation portion 24a. In this arrangement, erroneous operations are preventable.

Advantageous Effects of Invention

In the present invention, it is possible to move an operating rod with a small force to actuate an output rod.

BRIEF DESCRIPTION OF THE DRAWINGS

FIG. 1A is an elevational view in section of a robotic hand changer in a release state, to which an output device of a first embodiment of the present invention is applied. FIG. 1B corresponds to a cross section taken along a line 1B-1B in FIG. 1A. FIG. 1C corresponds to a cross section taken along a line 1C-1C in FIG. 1A.

DESCRIPTION OF EMBODIMENTS

Figures 2A, 2B:
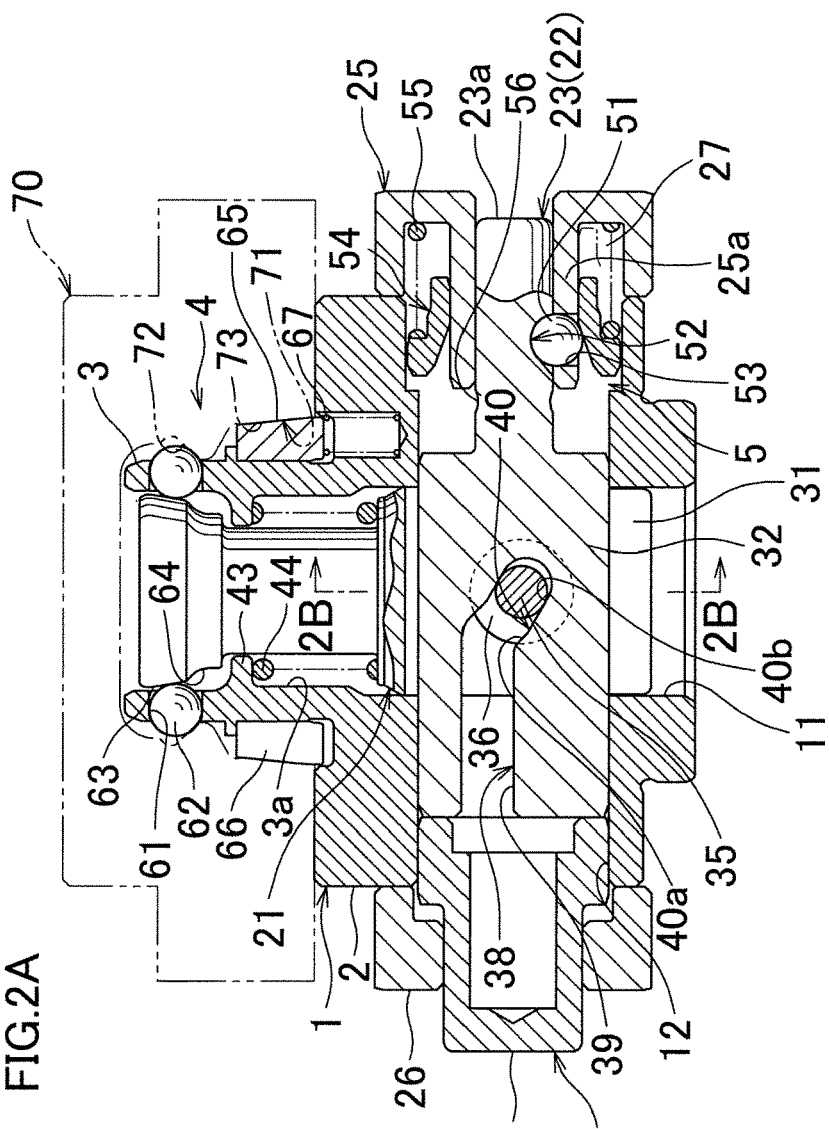
FIG. 2A shows the robotic hand changer in a lock state, and is a diagram similar to FIG. 1A.
FIG. 2B is a diagram similar to FIG. 1B FIG. 3A and FIG. 3B are a plan view and a front view of a stocker related to an embodiment of the present invention, and each shows a state in which the output device shown in FIG. 1 is inserted into the stocker holding an object to be clamped (tool adapter).

FIG. 1A to FIG. 2B show, by way of example, a robotic hand changer to which an output device of a first embodiment of the present invention is applied. First of all, the structure of the robotic hand changer will be described, with reference to FIG. 1A to FIG. 1C.

It should be noted that relative directional terms and phrases such as "upper", "above", "vertical (vertically)", and "horizontal (horizontally)" used in the following description are based on the premise that the output device is oriented as shown in FIG. 1A. The orientations of the output device and its constituents are not limited by the relative directional terms and phrases used in the following description. This is because the distal end of the robotic arm is able to be turned to various directions, and along with this, the orientation of the output device attached to the distal end of the robotic arm can change.

(Output Device)

A housing 1 of the output device includes: a housing main body 2, which is a main body portion; and a cylindrical plug portion 3 protruding unitarily upward from an upper portion of the housing main body 2. Components of the output device are disposed in the housing main body 2. Components of a clamp mechanism 4, which will be described later, are provided at the plug portion 3. The housing 1 (output device) is attached to a distal end of an unillustrated robotic arm.

A first guide hole 11 is disposed in the housing main body 2 so as to extend in a vertical direction. A second guide hole 12 is disposed in the housing main body 2 so as to extend in a horizontal direction. The second guide hole 12 crosses the first guide hole 11.

An output rod 21 is inserted into the first guide hole 11 and a cylindrical hole 3a of the plug portion 3 so as to be movable in the vertical direction (axial direction of the output rod 21). An operating rod 22 for driving is inserted into the second guide hole 12 so as to be movable in the horizontal direction (axial direction of the operating rod 22). The operating rod 22 includes a lock-side operating rod 23 and a release-side operating rod 24 which are arranged coaxially. A lock operation portion 23a, which is an end portion of the lock-side operating rod 23, is smaller than a release operation portion 24a, which is an end portion of the release-side operating rod 24. The lock-side operating rod 23 is inserted into the second guide hole 12, and is also inserted into a guide cylinder 25 fixed to a first lateral end of the housing main body 2. A flange portion 23b having a disc-like shape is provided to an intermediate portion of the lock-side operating rod 23. The release-side operating rod 24 is inserted into the second guide hole 12, and is also inserted into a guide cylinder 26 fixed to a second lateral end of the housing main body 2, the second lateral end being opposite to the first lateral end. The guide cylinders 25 and 26 are components constituting the housing 1.

A lower half portion (base-side portion) of the output rod 21 has an accommodation groove 31 extending in the horizontal direction and in the vertical direction. An insertion portion 32 provided to the lock-side operating rod 23 is inserted into the accommodation groove 31.

Side walls 31a and 31a of the accommodation groove 31 respectively support longitudinally opposite end portions of a pin 35, which functions as a guide member, in a rotatable manner via radial bearings 36. The insertion portion 32 of the lock-side operating rod 23 has a cam groove 38 disposed so as to correspond to the pin 35. The cam groove 38 includes a horizontal groove portion 39 and a driving groove portion 40 inclined rightward and downward. The driving groove portion 40 includes a first driving groove portion 40a and a second driving groove portion 40b which are different from each other in the inclination angle relative to the axial direction of the lock-side operating rod 23. The inclination angle of the second driving groove portion 40b (e.g., 30 degrees) is smaller than the inclination angle of the first driving groove portion 40a (e.g., 45 degrees). The cam groove 38 is fitted over (engaged with) a longitudinally central portion of the pin 35. Further, a lock spring 44 is attached in a space between a spring seat 43 provided at a midway portion of the plug portion 3 and a midway portion of the output rod 21.

A force multiplier 5 configured to assist movement of the lock-side operating rod 23 in its axial direction is provided at a right portion of the housing main body 2. The force multiplier 5 is structured as follows.

The lock-side operating rod 23 has, on its outer periphery, engagement recesses 52 configured to respectively receive engagement balls 51 functioning as engagement members in a fitted manner. The engagement recesses 52 are provided at predetermined intervals in a circumferential direction of the rod 23. Each engagement recess 52 has a cam surface 52a provided at a portion close to the center of the housing main body 2. The cam surface 52a is designed so that the distance between the cam surface 52a and the axis of the lock-side operating rod 23 decreases toward the end portion of the lock-side operating rod 23. Furthermore, a radially-inside cylindrical wall 25a of the guide cylinder 25 has a plurality of support holes 53 corresponding to the engagement recesses 52 and functioning as engagement member supporters. Each support hole 53 is configured to allow movement of the corresponding engagement ball 51 in the radial direction of the lock-side operating rod 23, and to restrict movement of the engagement ball 51 in the axial direction of the lock-side operating rod 23.

Moreover, a cylindrical pressing member 54 configured to press the engagement balls 51 is provided in a hollow portion 27 of the guide cylinder 25. The pressing member 54 has, on its inner periphery, a force-multiplying surface 54a. The force-multiplying surface 54a is designed so that the distance between the force-multiplying surface 54a and the axis of the lock-side operating rod 23 decreases toward the end portion of the lock-side operating rod 23. The inclination angle of the force-multiplying surface 54a relative to the horizontal direction (axial direction of the rod 23) is smaller than the inclination angle of the cam surface 52a relative to the horizontal direction (axial direction of the rod 23). A spring 55 configured to bias the pressing member 54 toward the center of the housing main body 2 is inserted between the pressing member 54 and a bottom surface of the hollow portion 27 of the guide cylinder 25. An annular engagement groove 56 is provided on a portion of the outer periphery of the lock-side operating rod 23, the portion being somewhat closer to the center of the housing main body 2 than the engagement recesses 52.

The clamp mechanism 4 is structured as follows.

An upper portion of a peripheral wall of the plug portion 3 has lateral through holes 61 arranged at predetermined intervals in the circumferential direction of the plug portion 3. In each of the through holes 61, an engagement ball 62 is inserted. An upper portion of the output rod 21 has a tapered outer circumferential surface 63 and a retraction groove 64 which are arranged vertically. The outer circumferential surface 63 is tapered narrower toward its lower end. A collet 65 is fitted to a lower half portion of the peripheral wall of the plug portion 3. The collet 65 has a slit 66 extending in the vertical direction. The collet 65 is configured to be radially contractible, and to be radially expandable by virtue of its resilience. The collet 65 is biased upward by advance springs 67. The plurality of advance springs 67 are arranged in the circumferential direction at predetermined intervals.

(Object to be Clamped (Tool Adapter))

A tool adapter 70, functioning as an object to be clamped by the output device, has an insertion hole 71 opening to an under surface of the tool adapter 70. Inside the insertion hole 71, an engaging hole 72 and a tapered positioning hole 73 are disposed vertically. A variety of tools are attachable to the tool adapter 70, though the tools are not illustrated.

(Stocker)

FIG. 3A to FIG. 5 show an embodiment of a stocker 100 constituting an output system of the present invention. The structure of the stocker 100 will be described with reference to FIG. 3A to FIG. 4B.

A pair of legs 81 and 81 are fixed onto a table, and a support wall 82 is fixed in a standing manner to back surfaces of the legs 81 and 81 via bolts 83a. A pair of receiving members 84 and 85 are fixed to the support wall 82 via bolts 83b so that the receiving members 84 and 85 extend horizontally. Ribs 84a and 85a reinforce the fixation of the receiving members 84 and 85 to the support wall 82.

The receiving member 84, which is one of the receiving members, has a placement table portion 86 of a groove-like shape extending horizontally. The placement table portion 86 is provided on a surface of a lower portion of the receiving member 84, the surface being opposed to the receiving member 85. Similarly to the above, the other receiving member 85 also has a placement table portion 87 of a groove-like shape extending horizontally. The placement table portion 87 is provided on a surface of a lower portion of the receiving member 85, the surface being opposed to the receiving member 84. The tool adapter 70 is inserted through open ends of the placement table portions 86 and 87, and is placed on the placement table portions 86 and 87. Note that, in regard to the vertical orientation, the tool adapter 70 shown in FIG. 3B is upside down relative to the tool adapter 70 shown in FIG. 1A.

As an alternative, the tool adapter 70 may be placed on a placement table portion having a flat plane, instead of being placed on the separated placement table portions 86 and 87 of the groove-like shape extending horizontally.

Furthermore, a guide groove 88 of a groove-like shape extending horizontally is provided on a surface of an upper portion of the receiving member 84, the surface being opposed to the receiving member 85. Similarly, a guide groove 89 of a groove-like shape extending horizontally is provided on a surface of an upper portion of the receiving member 85, the surface being opposed to the receiving member 84. In the guide groove 88, a horizontally extending lock guide groove 90 is further provided. An end portion of the lock guide groove 90 forms a slot 90a extending vertically. At an end portion of the lock guide groove 90 that is opposite to the slot 90a, there is a tapered surface 90b having a tapered shape. The tapered surface 90b is configured to contact the end portion (lock operation portion 23a) of the lock-side operating rod 23. In the guide groove 89, a horizontally extending release guide groove 91 is further provided. The release guide groove 91 includes, at a part thereof, a tapered surface 91a having a tapered shape. The tapered surface 91a is configured to contact the end portion (release operation portion 24a) of the release-side operating rod 24. The lock guide groove 90 is designed to have a width which allows the end portion of the lock-side operating rod 23 to pass through the groove 90 but does not allow the end portion of the release-side operating rod 24 to pass through the groove 90. The release guide groove 91 is designed to have a width which allows the end portion of the release-side operating rod 24 to pass through the groove 91. That is, the lock guide groove 90 and the release guide groove 91 are different from each other in size.

(Locking and Releasing Operations)

Now, a description will be given for operations for locking and releasing the tool adapter 70 using the stocker 100. In advance of the description, it is mentioned that, in regard to the vertical orientation, the output device and the tool adapter 70 shown in FIG. 1A and FIG. 2A are upside down relative to the output device and the tool adapter 70 shown in FIG. 3A to FIG. 5.

First of all, in the release state shown in FIG. 1A, the end portion of the lock-side operating rod 23 protrudes from the guide cylinder 25 (the rod 23 have been retracted rightward), and thereby the output rod 21 has been raised against the lock spring 44 (the output rod 21 has been lowered in FIG. 3B). Further, the engagement balls 62 are movable radially inward toward the retraction groove 64. (FIG. 1A shows the state in which the engagement balls 62 have already been moved). The engagement balls 51 constituting the force multiplier 5 are pressed by the pressing member 54, and therefore fitted in the engagement groove 56 provided on the outer periphery of the lock-side operating rod 23.

Figure 3A:
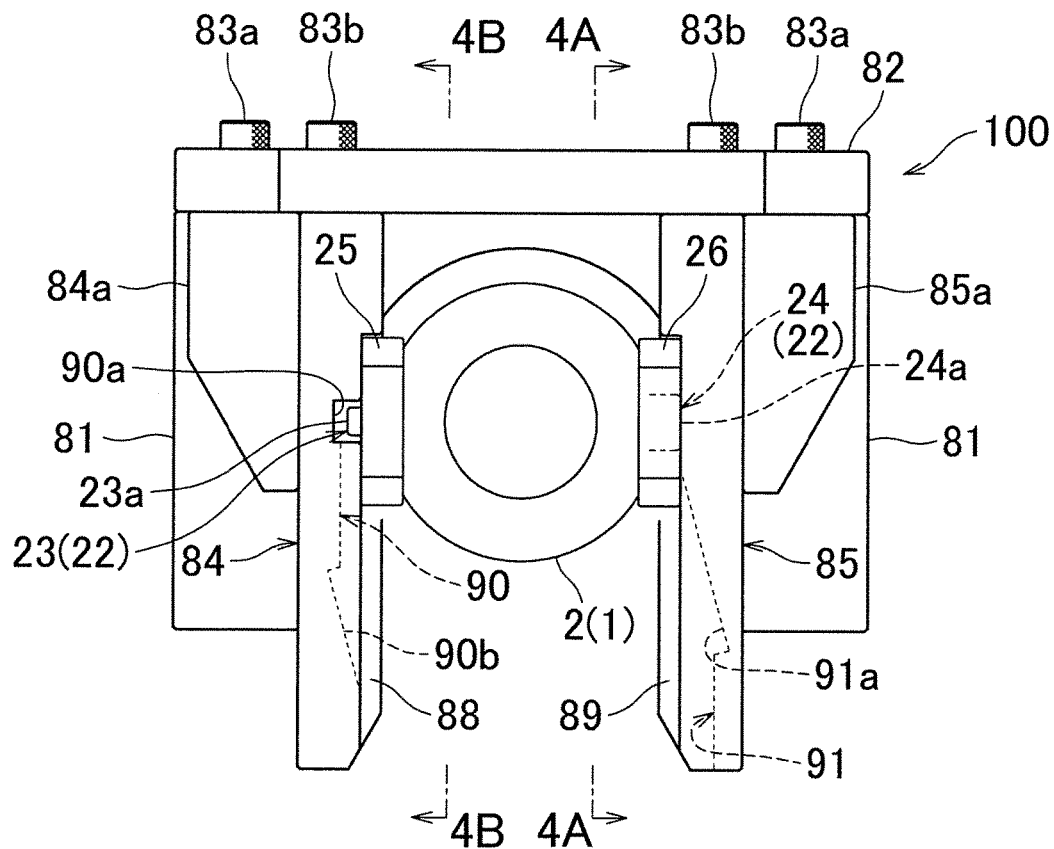
Figure 3B:
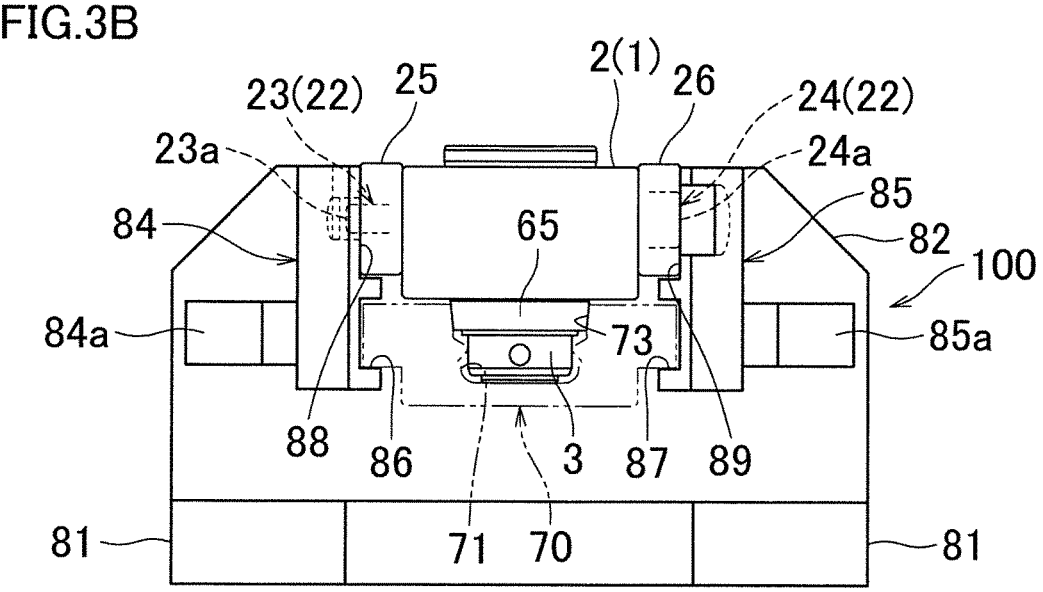
Figure 4A:
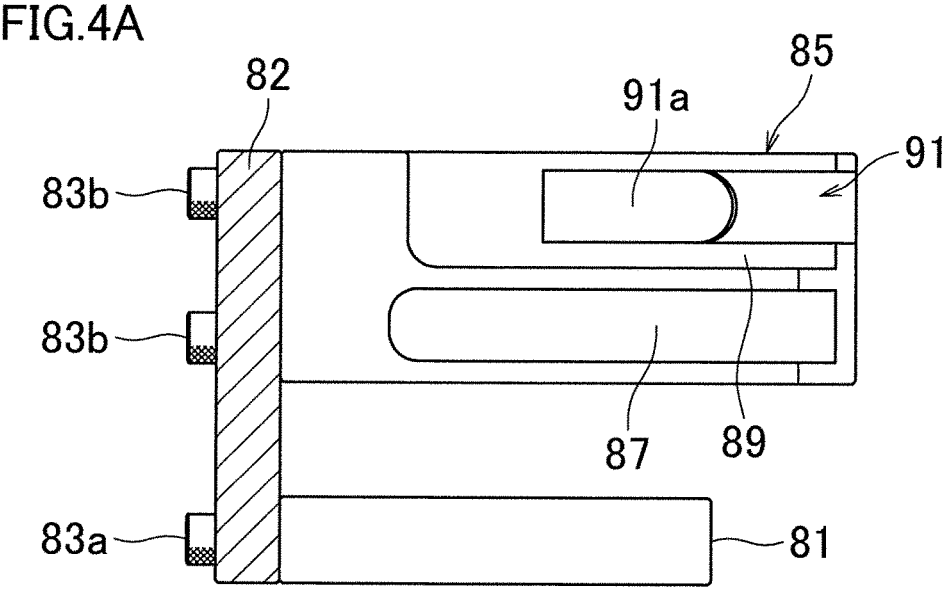
FIG. 4A corresponds to a cross section taken along a line 4A-4A in FIG. 3A.
Figure 4B:
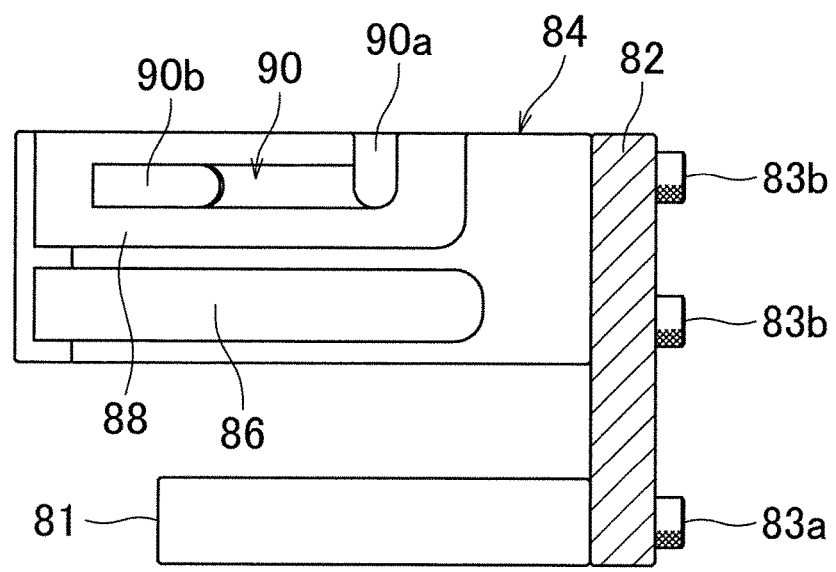
FIG. 4B corresponds to a cross section taken along a line 4B-4B in FIG. 3A. In both FIG. 4A and FIG. 4B, the output device and the object to be clamped (tool adapter) are not illustrated.

To change from the release state of FIG. 1A to the lock state of FIG. 2A, the robotic arm is moved in the following manner: as shown in FIG. 3A and FIG. 3B, while the end portion (lock operation portion 23a) of the lock-side operating rod 23 of the output device is inserted, from above, into the slot 90a of the receiving member 84 of the stocker 100, the plug portion 3 of the output device is inserted into the insertion hole 71 of the tool adapter 70 placed on the placement table portions 86 and 87 of the stocker 100, so that the tapered outer circumferential surface of the collet 65 is fitted in the tapered positioning hole 73 of the tool adapter 70.

Figure 5:
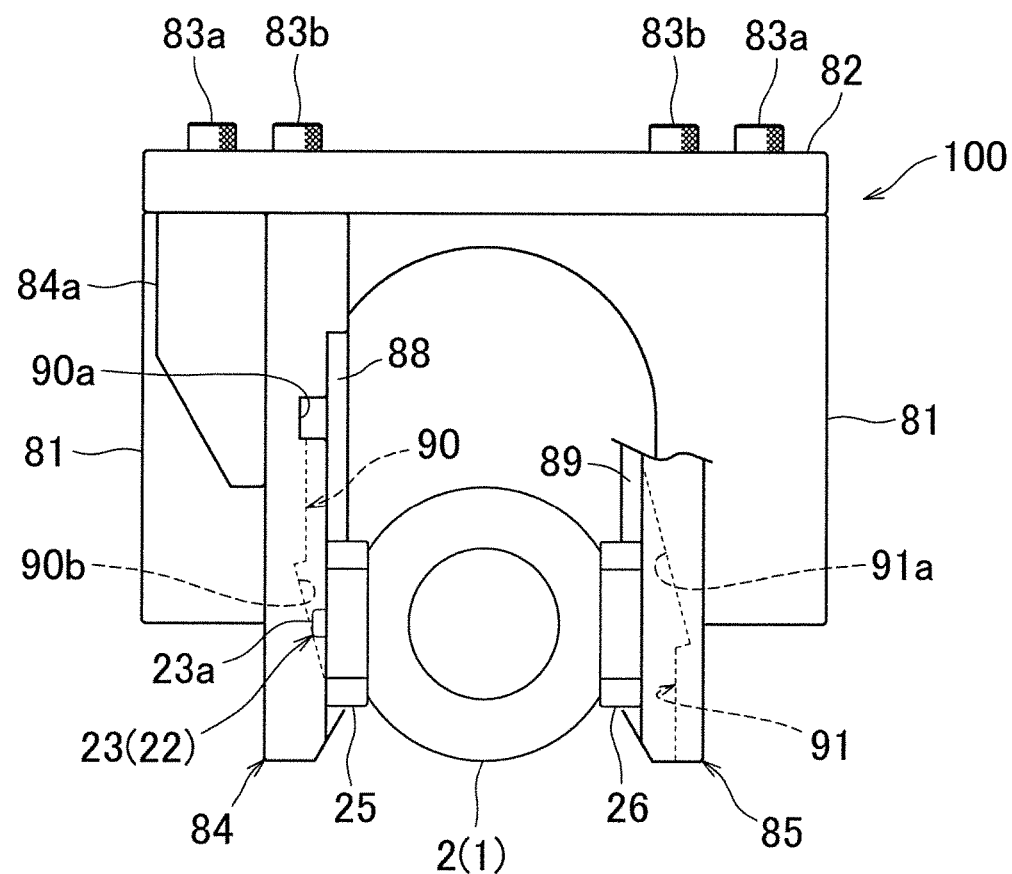
FIG. 5 is a plan view showing an intermediate state in which the output device in the release state shown in FIG. 3 is in the course of sliding movement.

Subsequently, as shown in FIG. 5, the output device is slid along the guide grooves 88 and 89 of the stocker 100 in a direction away from the support wall 82. When the end portion of the lock-side operating rod 23 reaches the tapered surface (guide surface) 90*b* of the lock guide groove 90, the end portion comes into contact with the tapered surface 90*b*. As the output device is further slid, the engagement balls 51 are disengaged from the engagement groove 56 due to the reaction force from the tapered surface 90*b*, and then the lock-side operating rod 23 is pushed into the guide cylinder 25. When the moving distance of the pushed lock-side operating rod 23 reaches a predetermined stroke, the engagement balls 51 are pushed onto the cam surfaces 52*a* of the respective engagement recesses 52 by a larger-diameter end portion of the pressing member 54 biased by the spring 55, and force multiplication driving (energizing driving) is started. The force-multiplying surface 54*a* of the pressing member 54 strongly presses the lock-side operating rod 23 into the guide cylinder 25 via the engagement balls 51 and the cam surfaces 52*a*.

As a result, the driving groove portion 40 of the lock-side operating rod 23 raises (lowers, in FIG. 1A) the output rod 21 via the pin 35. Then, by virtue of the resultant of the ascending force and the biasing force of the lock spring 44, the tapered outer circumferential surface 63 of the output rod 21 raises (lowers, in FIG. 1A) the tool adapter 70 via the engagement balls 62 and the engaging hole 72. With this, the tapered positioning hole 73 of the tool adapter 70 decreases the diameter of the collet 65 to bring the inner circumferential surface of the collet 65 into close contact with the outer circumferential surface of the plug portion 3, and raises the collet 65 against the advance springs 67. Consequently, a top surface of the tool adapter 70 is pressed onto an under surface of the housing main body 2.

The inclination angle of the second driving groove portion 40*b* of the driving groove portion 40 is smaller than the inclination angle of the first driving groove portion 40*a* of the driving groove portion 40. Because of this, after the pin 35 reaches the second driving groove portion 40*b*, the output rod 21 presses the engagement balls 62 with a force larger than that applied during the period in which the pin 35 passes through the first driving groove portion 40*a*. Further, there is an overlap between the period in which the pin 35 is in the second driving groove portion 40*b* and the period in which the engagement balls 51 are on the force-multiplying surface 54*a*. Therefore, the lock-side operating rod 23 driven by the force multiplier 5 with force multiplication causes, via the pin 35 and the second driving groove portion 40*b*, the output rod 21 to strongly push the engagement balls 62.

The above lock state is mechanically maintained by the biasing force of the spring 55 through the wedge function of the force multiplier 5. Thus, the lock state is reliably maintained.

To change from the lock state of FIG. 2A to the release state of FIG. 1A, the output device locking the tool adapter 70 is inserted into the stocker 100 through the open ends of the receiving members 84 and 85 of the stocker 100 along the guide grooves 88 and 89, in the reverse manner to that for the change from the release state to the lock state. When the end portion of the release-side operating rod 24 reaches the tapered surface 91*a* of the release guide groove 91, the end portion comes into contact with the tapered surface (guide surface) 91*a*. As the output device is further slid, the engagement balls 51 are disengaged from the engagement recesses 52 by virtue of the reaction force from the tapered surface 91*a*, and then the release-side operating rod 24 moving together with the lock-side operating rod 23 is pushed into the guide cylinder 26. When the release-side operating rod 24 is completely pushed into the guide cylinder 26, the release state shown in FIG. 1A is established. Thereafter, the output device is taken out from the stocker 100 by moving the output device upward.

It should be noted that the magnitude of the force pushing the release-side operating rod 24 into the guide cylinder 26 by virtue of the reaction force changes by increasing or decreasing the inclination angle of the tapered surface 91*a* relative to the sliding direction of the output device. Designing the tapered surface 91*a* to have a small inclination angle makes it possible to obtain a sufficient force for pushing the rod 24 even when the force applied in the sliding direction of the output device is small.

(Functions and Effects)

In the output device structured as above, the movement of the operating rod 22 in its axial direction is assisted by the force multiplier 5. This makes it possible to move the operating rod 22 with a small force. Thus, it is possible to perform the locking operation of causing the output device to lock the tool adapter 70, without using a driving means for generating a large force, such as a tool and a motor. The use of the spring 55 with high elasticity enables the operating rod 22 to move without an external force, once the force multiplication driving started. "The movement of the operating rod 22 in its axial direction is assisted by the force multiplier 5" encompasses not only cases in which an external force such as the reaction force and the multiplication force by the force multiplier are simultaneously applied to the operating rod 22, but also cases where the operating rod 22 is moved only by the multiplication force by the force multiplier after the operating rod 22 is moved a little as a result of application of an external force such as the reaction force to the operating rod 22.

Furthermore, the inclination angle of the second driving groove portion 40*b* of the driving groove portion 40 is designed to be smaller than the inclination angle of the first driving groove portion 40*a* of the driving groove portion 40. Because of this, after the pin 35 reaches the second driving groove portion 40*b*, the output rod 21 presses the engagement balls 62 with a larger force than that applied during the period in which the pin 35 passes through the first driving groove portion 40*a*.

Furthermore, in the locking operation, there is an overlap between the period in which the pin 35 is in the second driving groove portion 40*b* and the period in which the engagement balls 51 are on the force-multiplying surface 54*a*. Because of this, the lock-side operating rod 23 driven by the force multiplier 5 with force multiplication causes, via the pin 35 and the second driving groove portion 40*b*, the output rod 21 to strongly push the engagement balls 62.

The above lock state is mechanically maintained by the biasing force of the spring 55 through the wedge function of the force multiplier 5. Thus, the lock state is reliably maintained.

The lock-side operating rod 23 constituting the operating rod 22 is supported, not only by the second guide hole 12 provided in the housing main body 2, but also by the inner circumferential surface of the cylindrical wall 25*a* of the guide cylinder 25, and therefore provides good guide performance. Similarly to the above, the release-side operating rod 24 is supported, not only by the second guide hole 12 provided in the housing main body 2, but also by the inner circumferential surface of the guide cylinder 26, and therefore provides good guide performance. The flange portion 23b provided to the intermediate portion of the lock-side operating rod 23 further improves the guide performance provided by the second guide hole 12.

Second Embodiment

Figure 6:
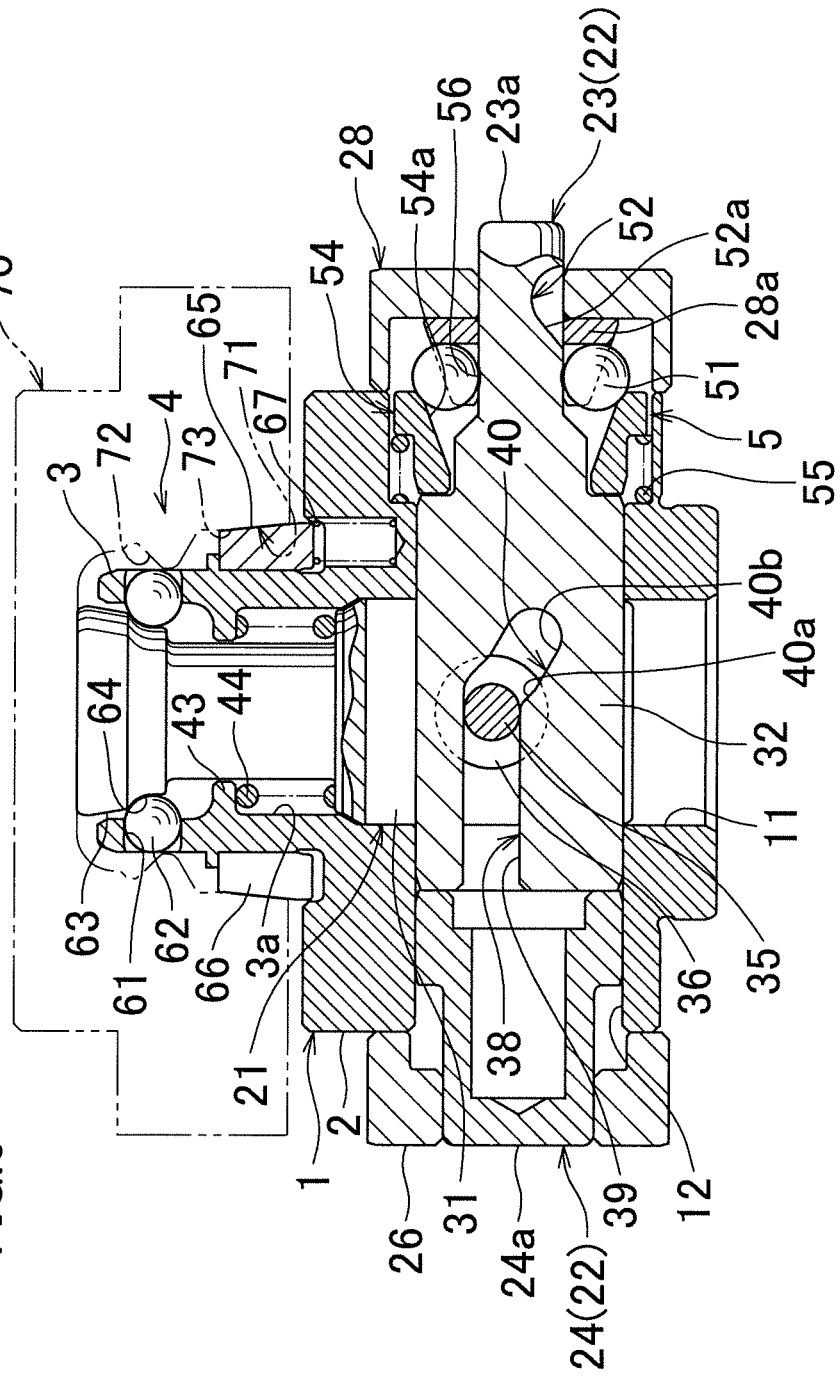
FIG. 6 shows a robotic hand changer to which an output device of a second embodiment of the present invention is applied, and is a diagram similar to FIG. 1A.

FIG. 6 shows a robotic hand changer to which an output device of a second embodiment of the present invention is applied. In Second Embodiment, the components the same as or similar to the components in First Embodiment are given the same reference numerals, in principle.

Second Embodiment in FIG. 6 is different from First Embodiment described above in the following points.

In FIG. 1A illustrating First Embodiment, the support holes 53 functioning as the engagement member supporters are provided in the radially-inside cylindrical wall 25a of the guide cylinder 25. Meanwhile, in FIG. 6 illustrating Second Embodiment, a protrusion 28a functioning as the engagement member supporter is provided on a surface of a guide cylinder 28, the surface being opposed to the engagement balls 51 in the axial direction of the cylinder 28, and the guide cylinder 28 is not provided with the cylindrical wall 25a and the support holes 53 which are provided in First Embodiment.

Furthermore, in Second Embodiment, the pressing member 54 is provided between the engagement balls 51 and the insertion portion 32 of the lock-side operating rod 23, and the spring 55 biasing the pressing member 54 is provided in the housing main body 2 so as to bias the pressing member 54 toward the outside of the output device.

(Modifications)

The above-described embodiments are changeable as follows.

To change the state of the output device to the lock state or to the release state, i.e., to move the operating rod 22 in its axial direction, the end portion of the operating rod 22 may be brought into contact with (abutted with) a surface of a freely-selected suitable object, in stead of using the stocker 100. Alternatively, the operating rod 22 may be moved in its axial direction by using an actuator such as a fluid pressure cylinder and a motor, or by pushing or pulling the operating rod 22 by hand.

The above-described operating rod 22 includes the lock-side operating rod 23 and the release-side operating rod 24, which are separate members. In this regard, the lock-side operating rod 23 and the release-side operating rod 24 may be unitarily formed as a single member. In this alternative, an engageable portion having a flange-like shape or hole-like shape, for example, may be provided at one of opposite end portions of the unitary operating rod 22, and the locking and releasing operations may be performed by pulling/pushing the operating rod 22 through an object engaged with the engageable portion.

The above-described force multiplier 5 is provided to a portion close to the lock operation portion 23a (on the lock operation portion 23a side). Instead of this, the force multiplier may be provided to a portion close to the release operation portion 24a (on the release operation portion 24a side), in the housing main body 2. In addition to the above, the direction in which the spring 55 constituting the force multiplier 5 biases the engagement balls 51 may be a direction crossing the axial direction of the operating rod 22, such as a direction orthogonal to the axial direction, instead of the axial direction of the operating rod 22.

The axial direction of the output rod 21 and the axial direction of the operating rod 22 do not have to be orthogonal to each other, and may cross each other so that they are inclined by a predetermined angle relative to the orthogonally crossing state. Furthermore, a base end portion of the output rod 21 (the end portion opposite from the clamp mechanism 4) may be structured as the operating rod, by providing a mechanism like the above-described force multiplier 5 at the base end portion of the output rod 21 and arranging the base end portion so as to protrude from the first guide hole 11. That is to say, the output rod and the operating rod may be formed unitarily with each other. In this case, the axial direction of the output rod is the same as the axial direction of the operating rod.

The output rod 21 and the first guide hole 11 may further extend downward (downward in FIG. 1A), and the above-described clamp mechanism 4 may be provided also at the end portion of the extensions. That is, two clamp mechanisms may be provided so as to be opposed to each other with the operating rod 22 interposed between them.

The pin 35 may be fixed to the side walls 31a and 31a of the accommodation groove 31, instead of being supported by the side walls 31a and 31a in a rotatable manner. In this case, a radial bearing may be fitted around a longitudinally central portion of the pin 35, and the longitudinally central portion may be fitted (engaged) in the cam groove 38 via the radial bearing. Furthermore, as the guide member, a ball, a key, or the like may be used, instead of the pin 35, which has been described by way of example. Each of the radial bearings 36 may be replaceable by a roller, for example.

Instead of the arrangement in which the accommodation groove 31 is provided in the output rod 11 and the insertion portion 32 is provided to the operating rod 22 (lock-side operating rod 23), the insertion portion may be provided to the output rod 11 while the accommodation groove may be provided in the operating rod 22 (lock-side operating rod 23).

The horizontal groove portion 39 of the cam groove 38 opens to the left in the embodiments, the left portion (left end portion) of the horizontal groove portion 39 may be closed.

The output rod 11 may be configured to be driven upward (upward in FIG. 1A) for locking, instead of being driven downward (downward in FIG. 1A) for locking. This configuration is achieved by changing the direction of inclination of the driving groove portion 40 of the cam groove 38. The driving groove portion 40 may be arranged so that its inclination angle does not change from its one end to the other end.

While the above-described clamp mechanism 4 is a mechanism using the engagement balls 62, a clamp mechanism described in Japanese Unexamined Patent Publication No. 2014-030892 may be used, for example.

The output device is applicable to various types of clamps, instead of being applied to the robotic hand changer.

Moreover, it is a matter of course that other changes or alterations can be made on the present invention within the scope of envisagement of one skilled in the art.

REFERENCE SIGNS LIST

1: housing; 5: force multiplier; 21: output rod; 22: operating rod; 23a: lock operation portion; 24a: release operation portion; 35: guide member (pin); 38: cam groove; 40: driving groove portion; 51: engagement member (engagement ball); 52: engagement recess; 52*a*: cam surface; 53: engagement member supporter (support hole); 54: pressing member; 54*a*: force-multiplying surface; 55: spring; 70: tool adapter (object to be clamped); 86, 87: placement table portion; 90, 91: guide groove; 90*b*, 91*a*: guide surface (tapered surface); 100: stocker

The invention claimed is:

1. An output device comprising:
an operating rod (22) inserted into a housing (1) so as to be movable in an axial direction of the operating rod (22), the operating rod (22) being configured to be moved in the axial direction by an external force in the axial direction applied to an end portion of the operating rod (22);
a force multiplier (5) provided between the housing (1) and the operating rod (22), the force multiplier (5) being configured to assist movement of the operating rod (22) in the axial direction; and
an output rod (21) configured to be moved by the operating rod (22) in a direction crossing the axial direction of the operating rod (22), wherein
the force multiplier (5) includes:
an engagement member (51);
an engagement recess (52) provided on an outer periphery of the operating rod (22) and configured to receive the engagement member (51) in a fitted manner, the engagement recess (52) having a cam surface (52*a*) configured to make engagement with the engagement member (51);
an engagement member supporter (53) configured to allow movement of the engagement member (51) in a radial direction of the operating rod (22) and to restrict movement of the engagement member (51) in the axial direction of the operating rod (22);
a pressing member (54) configured to be biased by a spring (55) thereby to press the engagement member (51), the pressing member (54) having a force-multiplying surface (54*a*) configured to make engagement with the engagement member (51);
a guide member (35) provided at a base-side portion of the output rod (21); and
a cam groove (38) provided in the operating rod (22) so as to be directly or indirectly make engagement with the guide member (35), the cam groove (38) having a driving groove portion (40) extending so that a distance from an axis of the operating rod (22) increases toward one of opposite axial ends of the operating rod (22).

2. An output system comprising:
an output device including:
an operating rod (22) inserted into a housing (1) so as to be movable in an axial direction of the operating rod (22), the operating rod (22) being configured to be moved in the axial direction by an external force in the axial direction applied to an end portion of the operating rod (22);
a force multiplier (5) provided between the housing (1) and the operating rod (22), the force multiplier (5) being configured to assist movement of the operating rod (22) in the axial direction; and
an output rod (21) configured to be moved by the operating rod (22) in a direction crossing the axial direction of the operating rod (22), wherein
the force multiplier (5) includes:
an engagement member (51);
an engagement recess (52) provided on an outer periphery of the operating rod (22) and configured to receive the engagement member (51) in a fitted manner, the engagement recess (52) having a cam surface (52*a*) configured to make engagement with the en-gagement member (51);
an engagement member supporter (53) configured to allow movement of the engagement member (51) in a radial direction of the operating rod (22) and to restrict movement of the engagement member (51) in the axial direction of the operating rod (22); and
a pressing member (54) configured to be biased by a spring (55) thereby to press the engagement member (51), the pressing member (54) having a force-multiplying surface (54*a*) configured to make engagement with the engagement member (51); and
a stocker (100) including a guide surface (90*b*, 91*a*) for the movement of the operating rod (22) in the axial direction,
the stocker (100) comprising:
a placement table portion (86, 87) configured to support an object (70) placed thereon and to be clamped by the output device; and
a guide groove (90, 91) including the guide surface (90*b*, 91*a*) provided on an inner surface of the guide groove (90, 91), and functioning as a guide for the end portion of the operating rod (22), the guide surface (90*b*, 91*a*) having a tapered shape, wherein
the movement of the operating rod (22) in the axial direction is achieved through insertion of the end portion of the operating rod (22) protruding from the housing (1) into the guide groove (90, 91) to bring the end portion into contact with the tapered guide surface (90*b*, 91*a*).

3. The output system according to claim 2, wherein:
a lock operation portion (23*a*), which is one of opposite end portions of the operating rod (22), is different in size from a release operation portion (24*a*), which is the other one of the opposite end portions of the operating rod (22); and
the guide groove (90, 91) includes a lock guide groove (90) corresponding to the lock operation portion (23*a*) and a release guide groove (91) corresponding to the release operation portion (24*a*).

4. An output system comprising:
the output device recited in claim 1; and
a stocker (100) including a guide surface (90*b*, 91*a*) for the movement of the operating rod (22) in the axial direction,
the stocker (100) comprising:
a placement table portion (86, 87) configured to support an object (70) placed thereon and to be clamped by the output device; and
a guide groove (90, 91) including the guide surface (90*b*, 91*a*) provided on an inner surface of the guide groove (90, 91), and functioning as a guide for the end portion of the operating rod (22), the guide surface (90*b*, 91*a*) having a tapered shape, wherein
the movement of the operating rod (22) in the axial direction is achieved through insertion of the end portion of the operating rod (22) protruding from the housing (1) into the guide groove (90, 91) to bring the end portion into contact with the tapered guide surface (90*b*, 91*a*).

5. The output system according to claim 4, wherein:
a lock operation portion (23*a*), which is one of opposite end portions of the operating rod (22), is different in size from a release operation portion (24*a*), which is the other one of the opposite end portions of the operating rod (22); and the guide groove (90, 91) includes a lock guide groove (90) corresponding to the lock operation portion (23*a*) and a release guide groove (91) corresponding to the release operation portion (24*a*).

\* \* \* \* \*